United States Patent
Pywell

(10) Patent No.: US 10,521,329 B2
(45) Date of Patent: Dec. 31, 2019

(54) DEBUGGING SYSTEM

(71) Applicant: Intergral GmbH, Boblingen (DE)

(72) Inventor: Darren Terence Pywell, Weil im Schonbuch (DE)

(73) Assignee: Intergral GmbH, Böblingen (DE)

( * ) Notice: Subject to any disclaimer, the term of this patent is extended or adjusted under 35 U.S.C. 154(b) by 62 days.

(21) Appl. No.: 15/147,463

(22) Filed: May 5, 2016

(65) Prior Publication Data

US 2016/0328308 A1 Nov. 10, 2016

Related U.S. Application Data

(60) Provisional application No. 62/158,771, filed on May 8, 2015.

(51) Int. Cl.
*G06F 11/36* (2006.01)

(52) U.S. Cl.
CPC ................... *G06F 11/362* (2013.01)

(58) Field of Classification Search
CPC ........................................ G06F 11/362
USPC ....................................................... 717/129
See application file for complete search history.

(56) References Cited

U.S. PATENT DOCUMENTS

| | | | |
|---|---|---|---|
| 7,225,433 B2 | 5/2007 | Jentsch et al. | |
| 7,447,942 B2 | 11/2008 | Chen et al. | |
| 7,849,450 B1 | 12/2010 | Rydh et al. | |
| 8,271,955 B1 | 9/2012 | Lindahl et al. | |
| 8,291,388 B2 | 10/2012 | Golan et al. | |
| 8,312,435 B2 | 11/2012 | Wygodny et al. | |
| 8,359,584 B2 | 1/2013 | Rao et al. | |
| 8,364,691 B2 | 1/2013 | Kennedy et al. | |
| 8,555,238 B2 | 10/2013 | White et al. | |
| 8,732,673 B2 | 5/2014 | Finking et al. | |
| 8,782,611 B1 * | 7/2014 | Kretzler | G06F 11/3632 717/129 |
| 8,806,449 B2 | 8/2014 | Bates | |
| 2006/0069830 A1 * | 3/2006 | Moyer | G06F 13/362 710/107 |
| 2009/0199163 A1 * | 8/2009 | Soroker | G06F 8/20 717/128 |
| 2009/0276771 A1 * | 11/2009 | Nickolov | G06F 9/4856 717/177 |

(Continued)

OTHER PUBLICATIONS

Zhou, et al.; "iWatcher: Efficient Architectural Support for Software Debugging"; Computer Architecture News, 2004; 12 pages.

*Primary Examiner* — Chat C Do
*Assistant Examiner* — Bradford F Wheaton
(74) *Attorney, Agent, or Firm* — Fitch, Even, Tabin & Flannery LLP

(57) ABSTRACT

A debugging software system facilitates the process of debugging the execution of a program in environments where the user is not constantly present. The debugging software can perform automated debugging functionality without a user present, and using a notification program, notifies a user if and when a user's manual presence may be useful and/or necessary. The debugging software system may be particularly useful in environments where it is prohibitive to have a user constantly present (e.g., production environments). The software system facilitates the process of issuing prompt fixes to program defects (e.g., bugs) without updating the software and/or the original source code of the program.

18 Claims, 10 Drawing Sheets

(56) References Cited

U.S. PATENT DOCUMENTS

| | | | |
|---|---|---|---|
| 2010/0017787 A1* | 1/2010 | Bellucci | G06F 11/366 717/111 |
| 2011/0055815 A1* | 3/2011 | Squillace | G06F 11/3612 717/125 |
| 2011/0321017 A1 | 12/2011 | Kapoor et al. | |
| 2012/0102469 A1 | 4/2012 | Kapoor et al. | |
| 2013/0247007 A1 | 9/2013 | Fuhrer et al. | |
| 2013/0318504 A1* | 11/2013 | Eker | G06F 11/3636 717/129 |
| 2014/0033181 A1 | 1/2014 | Wang et al. | |
| 2014/0297402 A1* | 10/2014 | Soudak | G06Q 30/0246 705/14.45 |
| 2015/0058824 A1* | 2/2015 | Smiljanic | G06F 11/3664 717/125 |
| 2015/0067622 A1* | 3/2015 | Goswami | G06F 17/5081 716/106 |
| 2016/0124834 A1* | 5/2016 | Davis | G06F 11/366 712/227 |
| 2017/0147471 A1* | 5/2017 | Shadi | G06F 11/3624 |

\* cited by examiner

FusionReactor UPD Alert
FusionReactor UPD email alert from instance : Tomcat7.0.42
http://192.168.1.19:8092/fusionreactor/findex.htm?p=updThreads&thread=89&details ▷

910

Exception Thrown
----------
Catch Location
   freemarker.core.Environment.visit(Environment.java:223)

Error reading included file template/~~~ajax/controlheader-core.ftl
The problematic instruction:
----------
==>include "/${parameters.templateDir}/${parameters.expandTheme}/controlheader-core.ftl" [on line 23, column 1 in template/xhtml/controlheader.ftl]
in include "/${parameters.templateDir}/xhtml/controlheader.ftl" [on line 24, column 9 in template/ajax/controlheader.ftl]
in include "/${parameters.templateDir}/ajax/controlheader.ftl" [on line 23, column 1 in template/ajax/datetimepicker.ftl]
----------

```
Groovy Script
Script Name
fixfreemarker 1   if (templateNameString.contains("ajax/controlheader-core.ftl"))
2 ▼ {
3       set("templateNameString","controlheader-core.ftl")
4   }
5
6   if (templateNameString.contains("ajax/tooltip.ftl"))
7 ▼ {
8       set ("templateNameString","tooltip.ftl")
9   }
10
```

FIG. 10

DEBUGGING SYSTEM

RELATED APPLICATION

This application claims priority to U.S. provisional patent application No. 62/158,771, filed May 8, 2015 and titled "Debugging System," which is herein incorporated by reference in its entirety.

TECHNICAL FIELD

The present disclosure generally relates to software systems. More specifically, the present disclosure describes software systems implemented to detect, fix, repair, or minimize/inhibit the impact of bugs in computer programs.

BACKGROUND

Programming involves presenting instructions that dictate operation of a computer and/or computer processor. Typically, these instructions are extremely detailed and complex logic-based commands that rely on each command operating as intended in accordance with a common logical thread. One error, such as a wrong instruction, a misplaced instruction, a wrong assumption, or an omitted necessary command can cause the program to fail. These errors are referred to as "bugs."

Computer programs typically undergo a debugging process to minimize the number and impact of bugs in a computer program. Debugging is a useful approach for discovering defects or bugs within a computer program. A user may debug a program in a development environment by recreating the conditions necessary for a bug to occur and then interactively observing the behavior of the program and any detected bugs. This debugging technique can be facilitated by executing a debugging application, program, or routine (often referred to as a "debugger").

Common debugger programs utilize breakpoints in the original script or source code of the software to find bugs. These breakpoints can be set at or near potential problem areas in the software code. In this manner, debuggers can help users reproduce the problem and then wait for the executed software to reach a breakpoint. Upon the software reaching a breakpoint, the execution may stop, and the debugger (e.g., via user operation) can then single-step through the code as a way to evaluate the source and/or cause of the bug.

SUMMARY

A debugger (e.g., a debugging program or software system) operates to debug a running computer program in an unattended manner. That is, the debuggers execute debugging functionality without the constant and/or continual presence of a manual user.

The debugger is able to achieve unattended functionality by executing various programs or routines that operate together to control the flow of a running computer program. While controlling the flow of the running computer program the debugger automatically issues notifications (e.g., emails, text messages, instant messages, alerts, or the like), and executes pre-prescribed actions to discover, diagnose, and/or repair bugs in the running computer program.

In some examples, the debugger program comprises a flow control program, or routine, that controls execution of the running computer program. The flow control program generates flow control instructions that include (1) breakpoint processing instructions, (2) notification instructions, and (3) action instructions.

An example debugger also includes a breakpoint processor program that operates in connection with the flow control program. The breakpoint processor program effects execution of breakpoint directions (e.g., it causes a computer processor to execute the directions) in response to the processor executing breakpoint processing instructions generated by the flow control program. For example, when the flow control program encounters a particular breakpoint (or multiple breakpoints), or breakpoints that fire in accordance with a particular set of rules, the breakpoint processor program may process directions associated with those breakpoints. Based on those breakpoint directions, or the ways in which the breakpoints fire, the flow control program directs the debugger to perform certain functionality, such as sending notifications or executing actions.

An example debugger also includes a notification program that operates in connection with flow control program. The notification program effects the generation and/or transmittal of a notification (e.g., an email, a text message, an audio/voice message, an instant message, a video message, an alert, or the like) in response to the processor executing a notification instruction generated by the flow diagram. For example, in response to the breakpoint processor processing certain directions, or the breakpoints firing in a particular manner, the flow control program may generate a notification instruction. In response, the notification program sends a notification to a user. That notification may simply inform the user of an issue, or it may allow the user to "claim" the breakpoint, for example, by clicking on a hyperlink embedded in the notification.

In some examples, the debugger program includes an action execution program that operates in connection with the flow control program. The action execution program will execute certain actions (e.g., instructions, directions, programs, subroutines, applications, or the like) when the flow control program generates an execution instruction. For example, in response to the breakpoint processor processing certain directions, the breakpoints firing in a particular manner, or the processed breakpoints being associated with an action, the flow control program may generate an execution instruction. In response, the action execution program will execute an action, thereby providing functionality designed to discover, diagnose, fix, or otherwise attend to bugs in the running computer program.

In some examples, the flow control program will generate breakpoint processor instructions (thereby activating the breakpoint processor program to process breakpoints) in response to encountering a breakpoint in the source code of the running program. Additionally and/or alternatively, the flow control program may generate breakpoint processor instructions in response to encountering a plurality, or a pattern of breakpoints in the running program. For example, the flow control program may generate breakpoint processor instructions when a particular breakpoint is encountered a minimum number of times (e.g., 2, 3, 4, or 5 times).

In some examples, the flow control program generates notification instructions in response to the breakpoint processor program executing breakpoint directions to generate a notification. For example, the breakpoint processor program may process breakpoint directions that indicate a user involvement in the debugging process would be helpful or necessary. In response, the notification processor will generate a notification instruction that effects the transmission of a notification to the user. Additionally and/or alternatively, the flow control processor may generate a notification instruction in response to processing of a certain number of breakpoints, or a particular pattern of breakpoints. For example, the flow control processor might generate a notification instruction when the breakpoint processor processes the same breakpoint (e.g., the breakpoint fires) a minimum number of times.

The flow control program can also generate an action execution instruction in response to the breakpoint processor program executing breakpoint directions associated with an action. For example, when the flow control program encounters a breakpoint, and the breakpoint processor program determines that the breakpoint is associated with an action, the flow control program may generate an execution instruction. In response to this execution instruction the action execution program will execute the action.

In operation, the described debugging software system facilitates the process of debugging a running program in environments without a user present. This can be particularly useful, for example, in environments where it is prohibitive or ineffective to have a manual user constantly present, for example, in production environments.

The debugging software can effectively perform automated debugging functionality without a user present to monitor or operate every step of the debugging process. Using a notification program, the debugging software can notify a user if and when a user's manual presence may be useful and/or necessary. The notifications can also comprise information that educates the user regarding the problem without the user attending the issue. Further, the debugger can capture program state information, variables, or other program data or information so that a user can later diagnose, repair, or otherwise attend to the problem based on this information. The debugging software system may be particularly useful in environments where it is prohibitive to have a user constantly present (e.g., production environments). The software system facilitates the process of issuing prompt fixes to program defects (e.g., bugs) without updating the software and/or the original source code of the program.

BRIEF DESCRIPTION OF THE DRAWINGS

FIG. 9 is an example of a breakpoint notification alert generated by a debugging software system described herein.

FIG. 10 is an example of an action code script of a debugging software system described herein.

DETAILED DESCRIPTION

Figure 1:
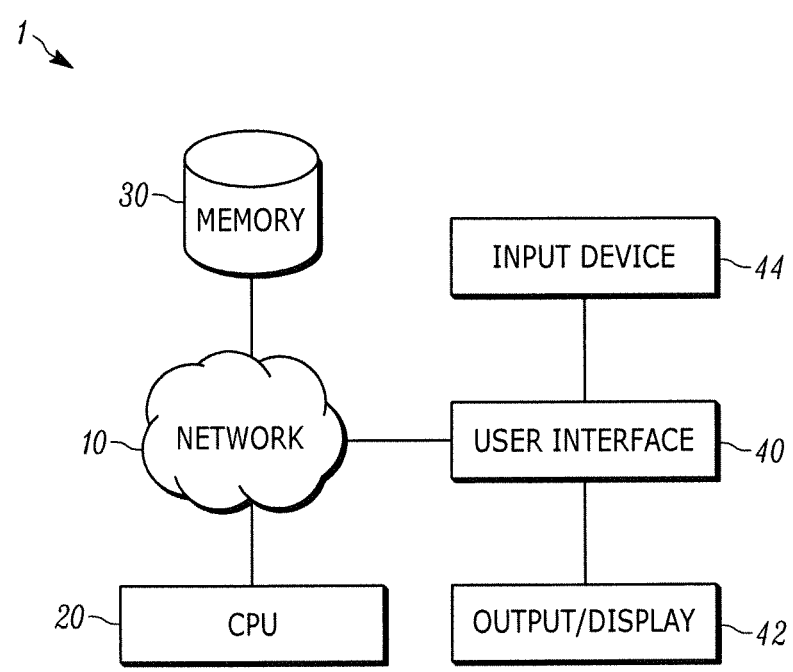
FIG. 1 is a block diagram showing components of a system that utilize a debugger in accordance with embodiments described herein.

The present disclosure describes debuggers, for example, debugging software systems, programs, routines, applications, and/or source code or computer scripts that execute on a computer to run the software systems, programs, routines, and applications. The present disclosure also describes methods for operating the debuggers, and systems, computers, and computer processors configured (e.g., pre-loaded with software) to execute the debuggers. The present disclosure also describes scripts or program source code files that have been, or are in the process of being modified or transformed by the debuggers, so that the files have fewer bugs.

The present disclosure describes a debugger that allows for debugging to occur with minimal input, feedback, or control by a manual user. The described debugger improves the functionality of a computer because it provides the computer with guidance and instructions to carry on a debugging routine without constant monitoring or supervision of a human user, and also because the debugger provides the computer with a running computer program that has less bugs, or logical errors, and therefore operates more effectively and efficiently.

The described debugger improves the way a computer functions to recognize bugs in a computer script, and to diagnose and fix those bugs. Such a system can be particularly valuable for debugging applications in non-development environments where manual users (e.g., programmers, developers, or other human operators) are not abundantly available. For example, the presently described systems can be particularly useful in production environments. This is at least partly because the described debugger provides a way to debug an application with a web-based interface. In this way, the described debugger can reduce or take away at least some of the challenges of debugging while setting up a development environment.

The described debugger can provide significant advantages to debugging a program in a production environment. Other debugging programs are more suited for use only in a development environment, as they do not address debugging issues that are present in production environments. As used throughout this application, a development environment refers to an environment, or state of program building where software is constructed by developers. The software deployed in a development environment is not typically used by end-users (e.g., it is not accessible via the internet) and can be considered as unfinished, under-development, experimental, or in the earlier stages of the software development life cycle. Computer programs deployed in development environments may often contain bugs that developers are able to investigate, modify and fix without any large impact to others. Because the program is still in development, the program can be readily stopped for debugging purposes, as there is no concern that an end-user will attempt to access the program and be disappointed or frustrated that the program is inaccessible.

Production environments contain software, hardware, and processes that are beyond development. Programs in a production environment have typically passed quality assurance procedures and may even be in use by end-users. For example, programs in production environments may be accessible via the internet or other network, so that end-users can access and operate the programs. Production environments are the final operating environments of computer software and are often regarded as critical to the operations of a business or organization. Within production environments, it is the aim of the software is to operate with as few bugs as possible and preferably to be bug free, as this allows users to perform the tasks that the software makes possible without interruption, corruption or loss of data, loss of functionality, loss of performance, loss of quality of service or outage. However, it is still possible that programs in production will experience bugs and require the use of a debugger. The presently described debugging application allows for debugging to operate efficiently in such an environment, without wholly or entirely restricting access to the program by end-users during the debugging process.

This application makes references to a "running computer program" (or "running program," "running application," "running script," etc.) in connection with the debugging program. As used herein, the term "running," as it relates to these programs, is intended to identify and reference to a program that is being debugged (or intended to be debugged). That is, the running computer program is the program that is being checked for bugs, and potentially repaired if bugs are found. The running program need not be actually "running," executing, or operating during all situations described in this application. The term "running" is used only as an identifier to distinguish the program that is being debugged, from the other programs that make up the debugger. It is not intended to limit the "running" program or application to applications that are presently in a running, or executing state.

This application also uses terms "script" and "source code" in reference to computer programs and applications. As used herein, a script and/or source code refers to a list of commands that are executed by a computer processor. Scripts and/or source code may be used to automate processes on a local computer or to generate web pages on the internet. For example, the script or source code of a running computer program comprises a series of commands that, when properly executed by a processor, perform a certain function or operation. Occasionally the script or source code of a running program will have errors (i.e., bugs) that cause the running program to operate less effectively. These errors can be fixed by modifying or transforming the script or source code to account for these errors, thereby "debugging" the running program.

Existing debuggers typically share a common model that involves a user (e.g., a live person) to manually start and operate the debugger program. For example, a user will start the debugger, recreate the bug, and then observe the debugger program while waiting for the software to reach a breakpoint.

Another model of a debugger involves halting execution of a program whenever a breakpoint is reached. In this manner, the program remains stopped until a user manually disables or removes the breakpoint.

Problems can arise, however, in non-development environments (such as production) when using these existing models. For example, such environments often contain bugs that cannot be detected or reproduced during the development and testing of the program due to differences such as scale, load, data, configuration, deployed software and other factors.

Further, bugs may take a very long time to occur and may happen at times outside of normal working hours. Accordingly, an attending user may not be present when the bug actually occurs. Because a program may experience a bug at any time, it can be difficult for a user to be available to start a debugging session when a bug occurs.

Additionally, a bug may occur only for a short period of time or even be a single event, meaning that the bug may no longer be prevalent or detectable by the time the user starts debugging.

Another example of a problem is that once a breakpoint halts the execution of the program, the program is partially or potentially completely stalled until a user resumes the execution of the program.

Further, if a bug cannot be reproduced in the development environment, the user may not be able to use a debugger and often must resort to manually analyzing the source code and log files where available. These approaches do not allow a user to easily gain deep insight into the behavior of the bug.

A user may attempt to debug a program on the computer system on which the bug was detected. However, this approach can be prohibitively time consuming and expensive. It can also be very difficult to organize installation and access to software development tools on computer systems that are not development systems.

Another significant problem can occur in multi-threaded programs where debuggers commonly halt every thread that arrives at a breakpoint. This may cause a program to become completely unresponsive and typically also means that the user cannot use the debugger until they are aware that the bug is occurring. As explained above, waiting for the bug to actually occur is often an ineffective approach.

A problem may also occur when a program arrives at a breakpoint very often, as this can cause frequent notifications that require a user to interact with the debugger in each instance in order for the breakpoint to be useful. This can be distracting and bothersome to the user.

Typically, non-development environments may not be manipulated in the ways required to recreate problems due to potential implications such as loss of service and corruption of data. Accordingly, employing a debugger in environments that are not in development can be a challenging task. The presently described debugging system addresses these and other problems, particularly those that require a user constantly attend or be involved in the debugging process.

To facilitate debugging in such environments, certain examples of the presently described debugger use control logic to determine whether a breakpoint should stop the execution of a program. The debugger also employs a notification mechanism to inform the user when a breakpoint has been reached. The debugger also uses a definable set of automated actions that can be performed on the user's behalf (e.g., automatically) by the debugger.

In operation, the user can define and create breakpoints that are associated with functionality, contingencies, or other prescribed instructions or definitions that include information relating to how and who will be notified if the breakpoint is reached. Such a defined breakpoint may be referred to as a triggerpoint.

The breakpoint definition may optionally define which actions should be taken if the breakpoint is reached. These breakpoint definitions can be distributed in a file, in the original source code, or they can be retrieved from an online service, thereby allowing for the breakpoints to be introduced into the debugger without a user being physically present. Accordingly, the debugger can start at the same time the program starts, or at any point afterwards while maintaining effectiveness.

In some examples, the debugger includes a breakpoint builder program that defines (or allows a user to define) breakpoints with directions and/or instructions that identify locations, conditions, and/or states that cause the program to stop execution when detected. In some examples, the debugger can be programmed to operate in accordance with flow control rules (i.e., "breakpoint fires") that define if and/or when the program should stop at the breakpoint.

For example, the debugger may also include a breakpoint processing program that determines whether or not to stop program execution upon processing a breakpoint. The breakpoint processing program processes directions/instructions encoded on the breakpoints (or otherwise analyzes the flow control rules, breakpoint fires, or other contingent instructions in the software) and the present operating conditions to determine whether the breakpoint directions/instructions dictate stopping the program, or whether the directions/instructions permit the program to continue execution. In some examples, the breakpoint processor program and the breakpoint builder program can be part of the same program.

FIG. 1 shows a block diagram featuring various components of a networked system 1 that employ the debugging tools described in the present application. The system 1 includes a network connection 10, a central processing unit 20 ("CPU") for a computing device, a memory storage 30, and a user interface 40. The network 10 allows various devices to communicate remotely. For example, via the network 10, the various components may communicate and interact with one another. The network 10 may include a network hub or network router, and may also include a connection through the internet. In some examples, the network may be nothing more than a series of electronic conductors that connect the various components of the system together 1, for example, where all the components are a part of a single local computer.

The CPU 20 may be a single processor, or it may include a plurality of processors on a single, or multiple computers. The CPU 20 is capable of executing at least some of the programs of the debugging routine, and may further be capable of executing or processing the source code of a running computer program (i.e., a program that is being debugged).

The CPU 20 communicates via the network with a memory storage 30. The memory storage can be any device capable of storing electronic media, data, or information. For example, the memory can include a hard drive, a flash drive, a disk or other drive, a memory chip, an SD card, or the like. In some examples, the memory 30 is a cloud-based data storage, and may itself comprise a network and connection to various other storage devices. The memory 30 is capable to store data files, databases, log files, and other files that maintain information in a manner that can be accessed via the CPU 20.

The system 1 also includes a user interface 40 in communication with the CPU 20 and the memory 30 via the network 10. The user interface 40 may include an output 42, such as a monitor or display screen (e.g., a display screen on a laptop computer, a tablet computer, a smart phone, etc.) and an input device 44, such as a mouse, keyboard, touchscreen, microphone, or other device that allows a user to interact with the CPU 20. Via the user interface 40, the CPU can display information to a user, and allow the user to interact with the debugging programs described herein.

By way of example, breakpoints can be defined based on one or more of the following: (1) a line of source code; (2) the occurrence of a program exception; (3) access or modification of variables, fields or program data; (4) entry or exit of a program method or function; (5) an event on the computer system or within a computer program; and/or (6) code that calls a breakpoint explicitly. Other techniques and locations for defining breakpoints can also be used.

The flow control definition of a breakpoint defines how often and under what conditions the breakpoint will stop the program execution ("breakpoint firing"). Example flow controls and their related functions can include, but are not limited to, the following:

Fire (n) number of times—i.e., the breakpoint firing permits the breakpoint to fire up to (n) times, stopping execution of the program with each breakpoint fire. After the nth firing, however, the breakpoint will no longer cause the program to halt execution. This can help avoid the running program from stalling in situations where the breakpoint causes certain parts of the running program to stop.

Fire one at a time—i.e., allow the breakpoint to fire only if this breakpoint is not currently already stopping the program execution Fire if no other breakpoints are stopped—the breakpoint is only allowed to fire if no other breakpoints are currently stopping execution of the program.

Fire every time—the breakpoint fires each and every time it is reached, regardless of other conditions or circumstances.

Figure 2:
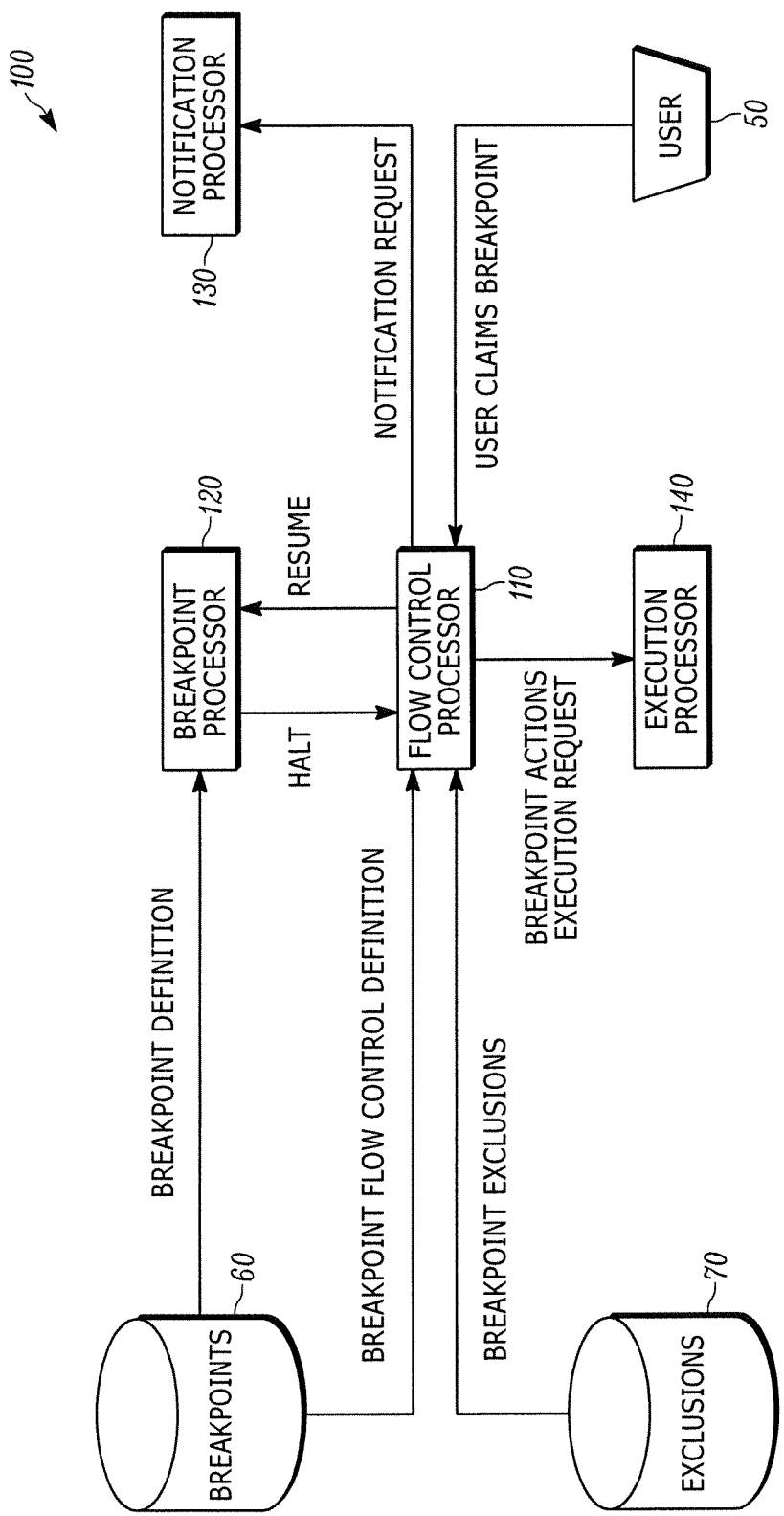
FIG. 2 is a block diagram showing an example of interaction among various programs and functionality of a debugging software system described herein.

Certain embodiments of the debugger involve executing one or more of a flow control program (or a "flow control processor"), a notification program (or "notification processor"), and an action execution program (or "execution processor"). FIG. 2 is a block diagram showing an example of interaction among various programs and functionality of a debugger 100 comprising several such programs. The debugger 100 is configured to be executed by a system such as the system 1 of FIG. 1. In particular, the debugger 100 program is configured to be executed by a CPU or series of CPU's in communication with a memory and a user interface.

The debugger 100 includes a flow control processor 110 that operates in connection with a breakpoint processor 120, a notification processor 130, and an execution processor 140. The debugger 100, by way of the flow control processor 110, interacts and processes breakpoints 60 and breakpoint exclusions 70, which may be embedded in the source code of the running computer program. The debugger 100 is also capable of interacting with a user 50, for example, via a user interface.

The flow control processor 110 can be a CPU configured to execute a series of flow control commands that make up a flow control program. The flow control program (or flow control application, routine, etc.) manages breakpoint firing and helps inhibit, limit, control, and/or prevent program stalls. Breakpoints can have flow control so that they avoid permanently halting the application, thereby potentially allowing the debugging process to occur without a complete loss of service. Flow control can also define how a breakpoint is "armed" (e.g., configured with contingency parameters) so that the breakpoint does not necessarily fire each and every time the software reaches the breakpoint.

The flow control processor 110 may also be referred to as, or may itself include, a script execution engine. The script execution engine is configured to process and/or execute instructions in the source code of the running computer program, and to monitor and maintain operating conditions of the running computer program. The operating conditions can include, for example, system variable values, timing features (e.g., time of day, length of time of or between certain events, etc.), process rules and logical conditions (e.g., the truth of various statements or formulas), and the like. The flow control processor can be configured to process source code of the running computer program, as well as breakpoints in the computer program, and also to generate flow control instructions. The flow control instructions can include, for example, breakpoint processing instructions, breakpoint direction execution instructions, notification instructions (e.g., prepare a notification, modify a notification, transmit a notification, etc.), action instructions (e.g., monitor, record, or store process operating conditions, modify, remove, or add to the script of the running computer program), and process flow instructions (e.g., process or execute various functionality or applications, modify system or process operating conditions, stop processing the running computer program, move to a different point in the running computer program, etc.), to name a few.

The breakpoint processor 120 works with the flow control processor 110 to process breakpoints that are encountered during processing of the running computer program. The breakpoint processor 120 and/or the flow control processor 110 can analyze various rules (e.g., contingent breakpoint rules) and exclusions associated with the breakpoint to determine whether the breakpoint is enabled. If it is determined that the breakpoint is not enabled (i.e., the conditions causing the breakpoint to fire are not met), the debugger 100 may either stop processing the running computer program, or continue to process the running program, but without executing any of the directions associated with the non-enabled breakpoint.

If it is determined that the breakpoint is enabled, and that exclusions do not apply, then the flow control processor 110 and/or the breakpoint processor 120 can execute or process the breakpoint. In some examples, the breakpoints are be equipped with directions, instructions, contingencies, or other rules that dictate how, when, and/or why notifications will be sent. For example, the breakpoints can be encoded with directions or instructions that instruct the notification program to send an email to a particular user if and when a certain breakpoint fires at a certain time of day, a predetermined number of times, or in connection with some other rule.

The notification processor 130, or notification program, can be configured to generate, modify, and/or transmit notifications, for example, to the user 50. The notification processor 130 is used to notify a user (e.g., a manual user) of a breakpoint firing. The notification processor 130 can notify or alert the user via a number of communication protocols, including for example, email, SMS, instant message, video message, audio message (e.g., a phone call), or the like. For example, the notification processor 130 may employ, or may operate in connection with an email program or a text messaging program, and automatically generate an email and/or text message when a breakpoint has fired.

Through these protocols, the notification program 130 can notify users that the breakpoint has fired, and can also provide detailed program context information in the notification. This function can free up a user's time so that the user does not have to be continuously and/or constantly in attendance to observe the debugger waiting for breakpoints to fire.

In certain aspects, the debugger system may implement breakpoint notifications that contain hyperlinks. A user may click on a hyperlink to be directed to claim a breakpoint for interactive debugging. By claiming a breakpoint, the program will remain halted at the breakpoint, allowing the user to interactively debug the program. Normal program execution may be resumed by the user at any time. If the user does not claim a breakpoint by the end of a predetermined period of time (e.g., as defined by a pause timer function), the execution program will run any actions defined for the breakpoint and then allow the program to resume execution.

The execution processor 140 executes actions defined on the breakpoint that are to be undertaken when a problem occurs on behalf of the user. Multiple actions can be defined for each breakpoint. Breakpoints may define automated computer code that is executed after the breakpoint fires that can amongst other things be used to discover details of the program's behavior and fix problems without the need to alter the program's original source code.

In some examples, actions executed by the execution processor 140 are gathering actions configured to monitor and record and/or store information pertaining to the running computer program. For example, the gathering action may record the present operating conditions (e.g., values of process variables, time stamps, logical conditions, etc.) in a data file on the memory 30. In this way, the gathering action might involve creating, maintaining, modifying, or deleting a log or database on the memory 30. The gathering action may cause the generation of logs, alerts or notifications. In some examples, the gathering action may cause the capturing and/or storage of data and program state, and the gathering of metrics from the program.

Figure 8:
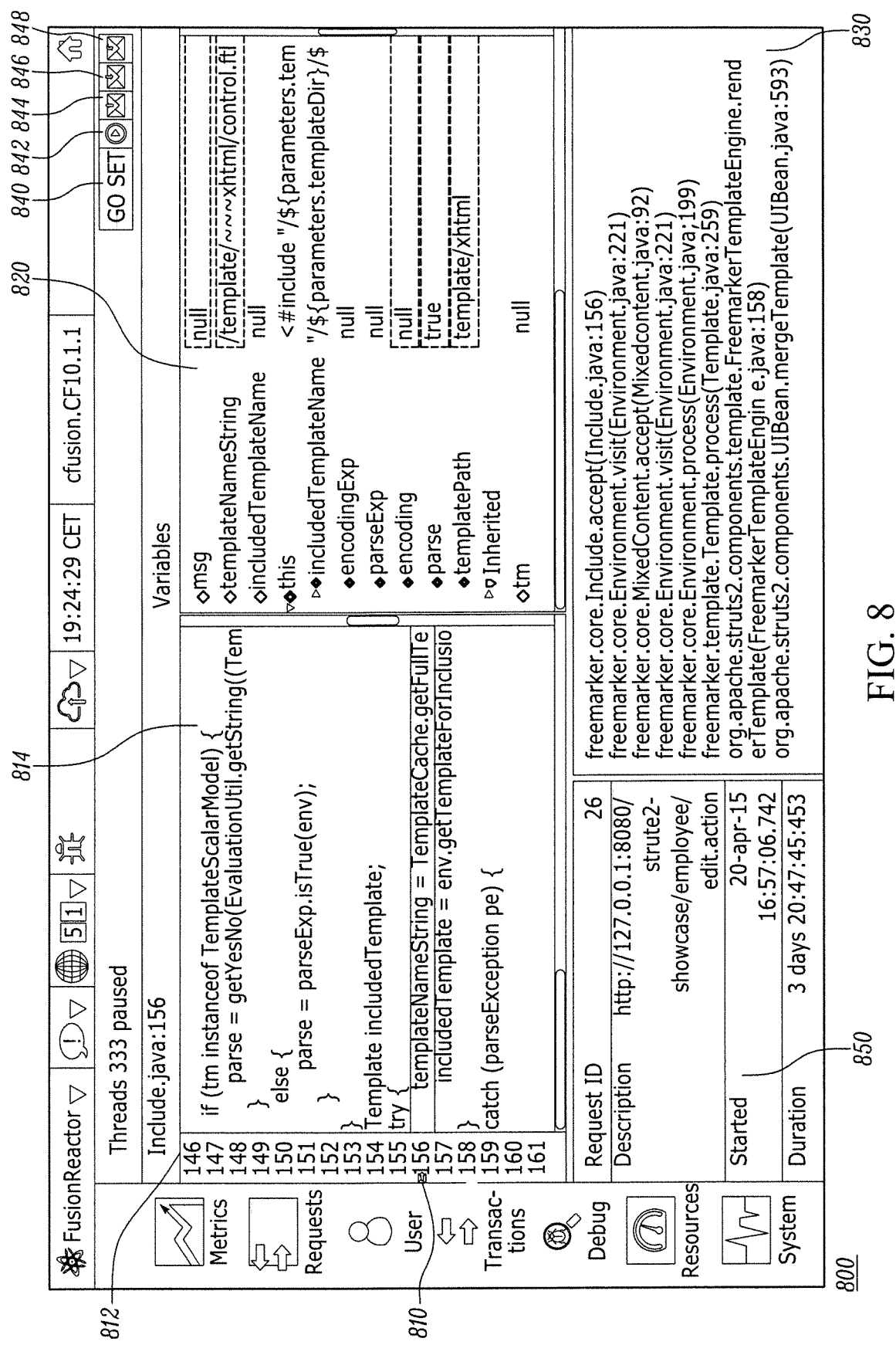
FIG. 8 shows a screen shot of an example debugger interface for an interactive debugging breakpoint session.

In other examples, actions executed by the execution processor 140 are code modification actions configured to look for bugs in the script of the running computer program, and to diagnose and/or modify the script accordingly. Code modification actions can be automatically generated without a user interaction, for example, and may include executing a repair application or other debugging program. The code modification instruction can replace or inject code at a breakpoint or other location in the source code of the running program. In other examples, code modification actions can present an interactive mode that enables a user to interactively debug the execution of the program. For example, when the software is used in an interactive mode, the user may "claim" a breakpoint that has fired within the breakpoint's allotted pause timer to convert the breakpoint into an interactive real-time debugging breakpoint session. Once a breakpoint has been claimed, the pause timer can then be removed on the instance of the breakpoint. An example of such an interactive mode is shown in FIG. 8, and discussed in more detail below.

Figure 7:
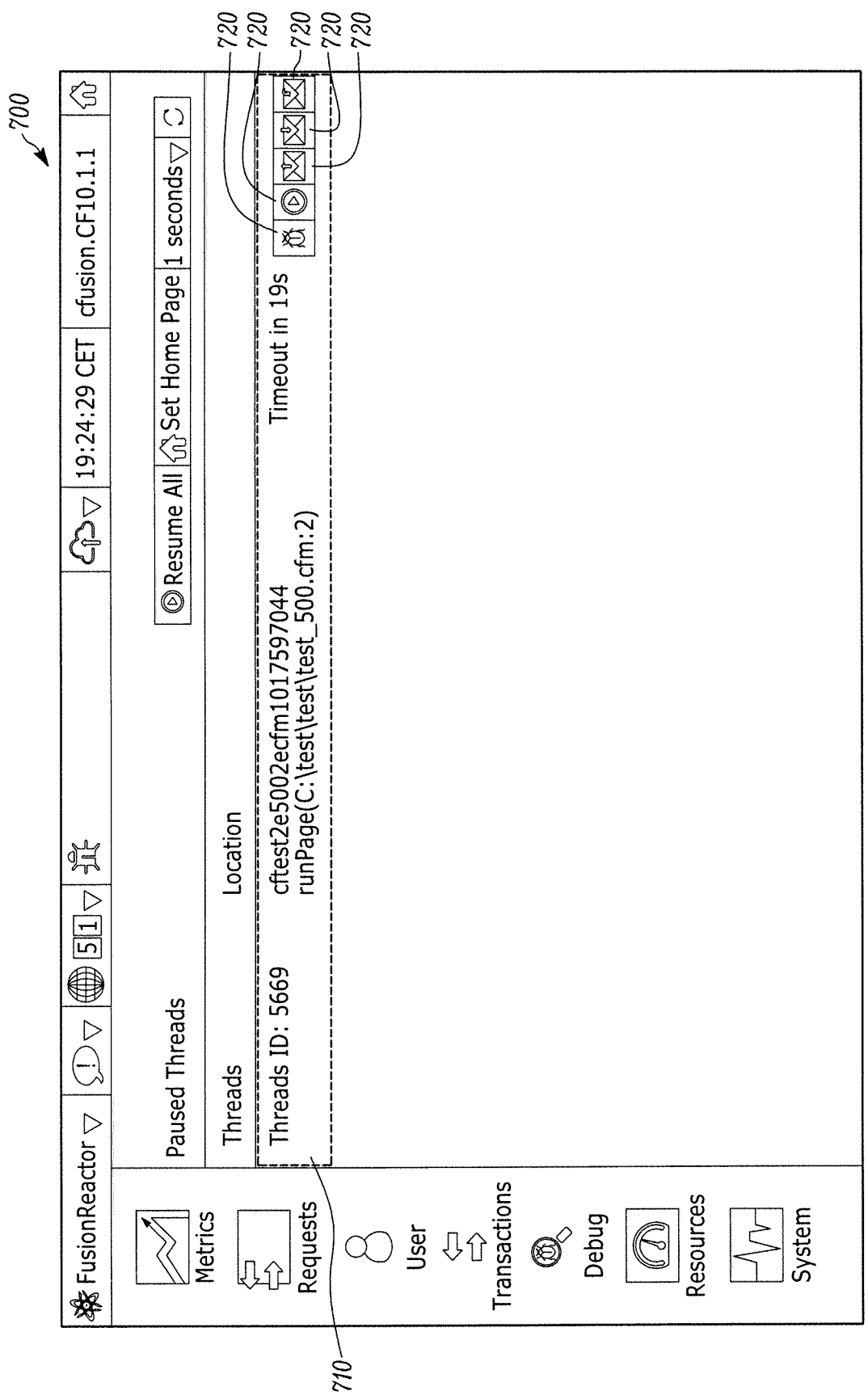
FIG. 7 shows a screen shot of an example debugger interface displaying an example of a breakpoint pause timer function.

The execution processor 140 may also execute flow control actions configured to control how the flow control processor 110 processes the running computer program. For example, flow control actions may execute a pause timer that defines how long the software should remain stopped at the breakpoint. For example, the pause timer can be programmed to re-start the software after a certain amount of time (e.g., seconds, minutes, hours, etc.), which may be set forth in the flow control rules or other directions/instructions associated with the breakpoints. FIG. 7 shows an example interface screen executing a pause timer of the debugger. Flow control actions may also involve presenting a user interface that allows a user the ability to step into, over, or out of the source code of the running computer program. Flow control actions can effect the flow control processor 110 to execute a code script of the running program, halt execution or processing of the running program until the occurrence of an event, adjust the program resource requirements, secure and/or control program usage, resume a program or a script of the running program, to halt or abort processing of the running program, or other similar functions. In some examples, a flow control action may cause various certain program variables or conditions to change. For example, a flow control action may change the truth of an if/then condition, or change the value of a process variable. Flow control actions may set, modify, or remove certain program variables. Some flow control actions may adjust or modify the resource requirements of the running computer program. In this way, the flow control actions (as well as other actions) can be used to help determine what conditions cause a bug to appear, so that the bug can be diagnosed and repaired and/or eradicated.

Flow Control

Flow control is the method for managing breakpoint firing. Flow control helps avoid program stalls. The flow control process is used to make determinations on whether or not a breakpoint should halt the execution of the program based on the flow control definition of a breakpoint and other stall avoidance logic. Flow control helps protect against a breakpoint halting the execution of a program in locations that could potentially cause the program to partially or completely stall.

Breakpoint Handling

In operation, the debugger 100 handles breakpoints 60 through a variety of techniques. For example, the debugger 100 checks the breakpoint to determine if the breakpoint is currently enabled. If the breakpoint is disabled then the debugger effects the operating program to resume immediately, or nearly immediately.

The debugger 100 also checks enabled breakpoints to determine whether any defined breakpoint exclusions 70 are met. Breakpoint exclusions are defined for the program (e.g., by the breakpoint builder program or as part of a flow control program), and can contain, but are not limited to, a set of program exceptions or source code locations that set forth when and how a particular breakpoint should be ignored. If the breakpoint matches a breakpoint exclusion then the debugger ignores the breakpoint and resumes operation of the program.

Figure 3:
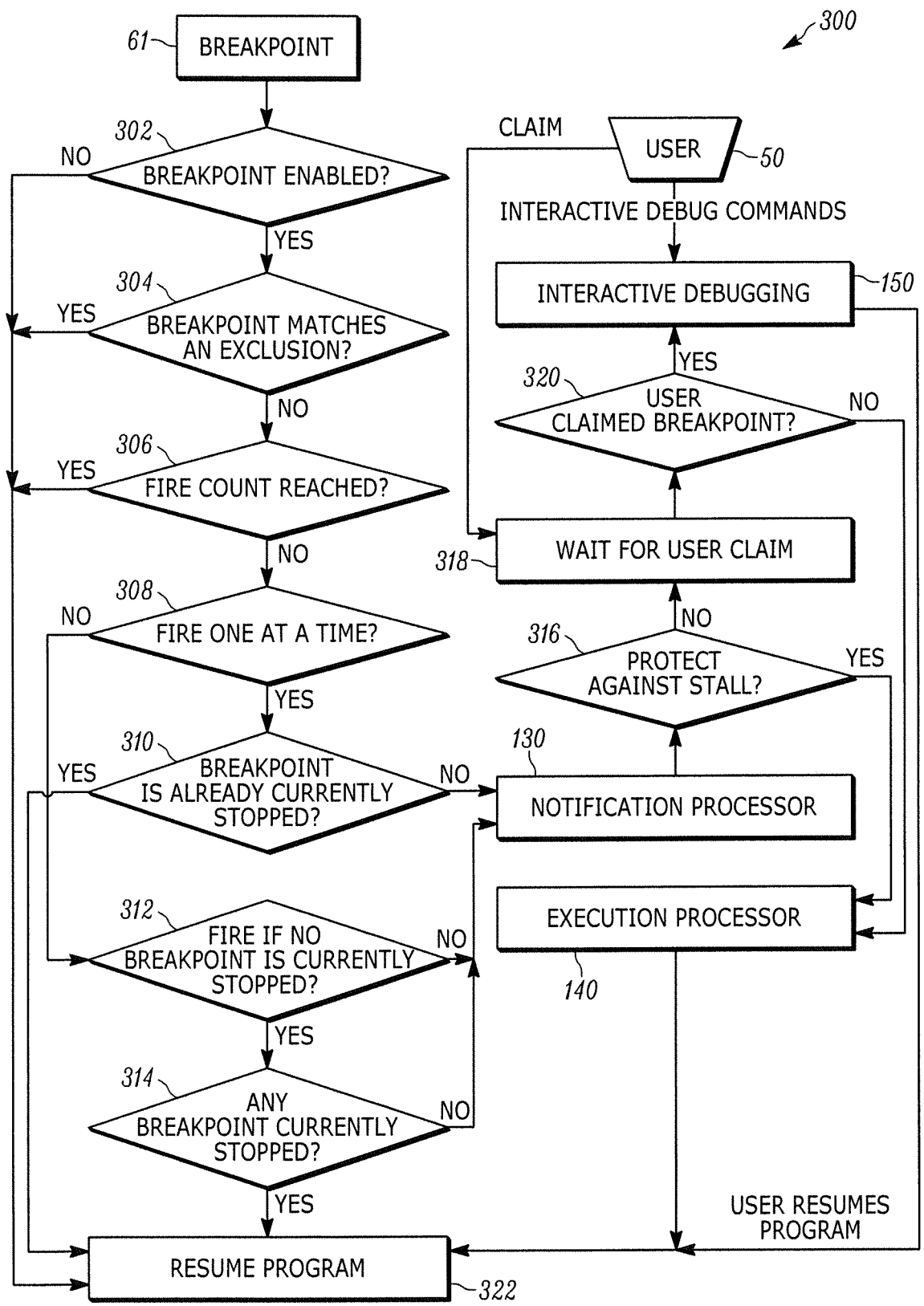
FIG. 3 is a control flow diagram of an example debugging method operated by an example of the described debugging software system.

If the breakpoint does not match an exclusion, the debugger continues to check the breakpoint against the flow control types. The flow control definition of a breakpoint defines how often ("fire count") and under what conditions the breakpoint will stop the program execution ("breakpoint firing"). As described and defined above, examples of flow controls are may include (1) fire (n) times, (2) fire one at a time, (3) fire if no breakpoint is currently stopped, and (4) fire every time. Other examples can include a breakpoint schedule, where the breakpoint will only fire during certain time periods, such as times where a user is expected to be present (e.g., non-holidays Monday through Friday, 9 am to 5 pm). In some examples, the flow control definitions can also be applied to a group of breakpoints. An example flow diagram of a flow control method 300 is shown in FIG. 3, and described in more detail in the following sections.

It should be noted that breakpoint fire counts employed by the claimed debugger system differ from "hit count" techniques used in other debugger systems. For example, hit counts cause the breakpoint to halt the program only after the breakpoint has been hit (or reached) the predetermined number of times. Differently, the fire counts employed herein permits the breakpoint to fire a predetermined number of times. Hit counts and fire counts can be mutually compatible.

Stall Avoidance

Halting the program for a long period of time inside of a critical section can lead to the program becoming unstable or completely stalled. Accordingly, in multi-threaded programs, the debugger can use locks and synchronizers to create critical sections of code that inhibit and/or prevent more than one thread from entering the critical section.

The debugger can perform stall avoidance as a check when a breakpoint fires to identify that the program is currently in a location that could cause the program to stall either partially or entirely. In this manner, each breakpoint or all breakpoints can be marked (e.g., marked by the breakpoint builder program and/or the flow control program) as protected against stall avoidance, thereby helping the debugger recognize when to avoid halting the program.

User Breakpoint Claim

In some examples, a pause timer can define a breakpoint. The pause timer defines the amount of time that the breakpoint will halt the execution of the program at the breakpoint. The pause timer can be, for example, the amount of time the user has to claim the breakpoint to start interactive debugging. After the pause timer expires, the debugger resumes execution of the program from the breakpoint.

In some examples, claiming the breakpoint within the breakpoint's pause timer will convert the breakpoint into an interactive debugging breakpoint. The pause timer is then removed on the instance of the breakpoint which will cause the program execution to remain halted until the user resumes it.

For example, when a breakpoint associated with a pause timer fires, the debugger allows a user to claim that breakpoint during the pause, thereby allowing the user to interactively debug the running program. If the breakpoint is not claimed during the period in which the running program is paused by the pause timer, then the debugger can run any pre-defined actions and resume operation of the running program.

Claiming a breakpoint allows the user to investigate a bug in the same, or a similar way that an interactive development debugger would allow. In some debugging systems, a user interactively debugging the running program may result in a drawback that the program remains partially or completely stalled during the interactive debugging session. The pause timer function helps mitigate this loss while still allowing for interactive debugging.

Interactive Debugging Mode

Some embodiments of the debugger system will operate an interactive debugging mode. That is, the debugger system will operate a user interface that will allow a user to interactively and manually debug the operating program. The interactive debugging mode may display the stack, the current variable state, and the source code of the program.

In many environments the source code may not be available. In such cases the debugger system can be equipped to implement a link to the source code via a remote system, such as an online source code repository. Additionally and/or alternatively, the debugger system can use a program decompilation function to generate an approximation of the source code that will normally be more than adequate for debugging purposes.

FIG. 8 shows an example screenshot of a user interface displaying the debugger system operating an interactive debugging mode. More specifically, the screen shot of FIG. 8 shows an interactive breakpoint session that shows the number program threads presently paused, as well as source code, variables, and other program operating functions/features.

Flow Control Flowchart

FIG. 3 is a control flow diagram of an example debugging method 300 operated by an example of the described debugging software system. FIG. 3 represents one example of a technique for debugging a program, but it should be appreciated that deviations to the flow control process depicted in FIG. 3 can be made while still remaining within the scope of the present disclosure.

In one example, the flow control method 300 begins by analyzing a breakpoint. This method can be performed, for example, by the breakpoint processor, the flow control processor, or a combination thereof, as depicted in FIG. 2. At step 302, the method considers whether the breakpoint is enabled. If not, the debugger will resume running the program, as shown in FIG. 2.

If the breakpoint is enabled, the debugger will consider 304 whether the breakpoint matches a specifically defined exclusion. If the breakpoint matches an exclusion, the debugger will continue operation of the program without further breakpoint processing. If, however, the breakpoint does not match an exclusion, the breakpoint processing will continue.

For situations where the breakpoint is enabled and not excluded, the debugger can perform flow control processing techniques as shown in FIG. 3. The flow control techniques can vary depending on the type of breakpoint, and the directions/instructions associated with those breakpoints. The flow control can determine what type of breakpoint is being processed. Based on the breakpoint types and the current operating conditions, the debugger system can employ the notification program, the execution program, and an interactive debugging program to complete the debugging task.

In some examples (e.g., where the breakpoint is a "fire (n) times" breakpoint, as defined above), the flow control method 300 determines 306 whether the breakpoint has fired a predetermined number of times (n). If so, the flow control may disable a breakpoint check, and the debugger system can use the notification program to issue appropriate correspondence, for example, to a user.

In other examples (e.g., where the breakpoint is a "fire every time" breakpoint), flow control will determine whether the breakpoint has fired at all, and then initiate the notification process.

The method 300 may also determine 308 how the breakpoint is to fire. If the breakpoint is a "fire one at a time" breakpoint (i.e., the breakpoint only fires if not currently stopped) the flow control may then determine 310 whether the breakpoint is currently not already stopping the execution of the program in some other manner. If it is determined that the breakpoint is currently stopping the program, the debugging process may resume 322. If not, then the firing breakpoint may initiate the notification process, for example, using the notification processor 130 to generate and transmit, or allow a user to generate, modify, and transmit a notification.

If the breakpoint is not of the "one at a time" breakpoint, it can then be determined 312 if the breakpoint is a "fire if no other breakpoints are stopped" breakpoint (i.e., a breakpoint that fires only if no other breakpoint is stopping the running program). If it is such a breakpoint, the flow control 300 checks 314 checks if any other breakpoints are presently stopping the execution of the program. If so, then the flow control 300 may initiate resuming the program 322. If no breakpoints are currently stopped, then notification process can be initiated.

Notification

If so instructed, the notification program 130 can prepare and send notifications to a remote user. Notifications can either be defined individually on each breakpoint, collectively for all breakpoints, or some combination thereof.

A notification will tell the user that a breakpoint has fired without the user needing to attend the debugging process, or otherwise actively observe the debugger. This in turn allows the user to perform other tasks instead of waiting for a bug to occur.

In some examples, the notification will contain detailed information from the debugger about the program state and variables at the moment that the breakpoint fired. Notifications may contain enough information for the user to be able to diagnose the problem in many cases.

After initiating a notification program 130, the method 300 may determine whether the process should protect against a program stall 316. If so, then the method 300 may defer to the execution processor 140 to initiate one or more series of actions. If there is no need to protect against a stall, then the method 300 may wait for a user 50 to claim the 318 the breakpoint. For example, the method may listen to receive signals from an input device.

User Breakpoint Claim Link

Some examples of the debugger system will implement breakpoint notifications that contain hyperlinks. These hyperlinks may be embedded into notifications that are sent to a user. Upon receipt of the notification, a user may click on the hyperlink to claim a breakpoint for interactive debugging. For example, selecting the hyperlink with an input allows the user 50 to claim the breakpoint 320. Upon receipt of such a signal indicating that the user claimed the breakpoint 320, the processor implementing the method 300 may initiate a manual debugging process, for example, via an interactive debugging program 150 which.

FIG. 9 is an example of a breakpoint notification alert generated by a debugging software system described herein. As shown in FIG. 9, the alert comprises a hyperlink, which, when clicked by a user, allows the user to claim the breakpoint and enter into an interactive debugging process.

By claiming a breakpoint, the program will remain halted at the breakpoint allowing the user to interactively debug the program until they resume it. If the user does not claim a breakpoint by the end of the pause timer, the execution program will run any actions defined for the breakpoint and then the program will resume.

Notification Rate Limiting

Figure 4:
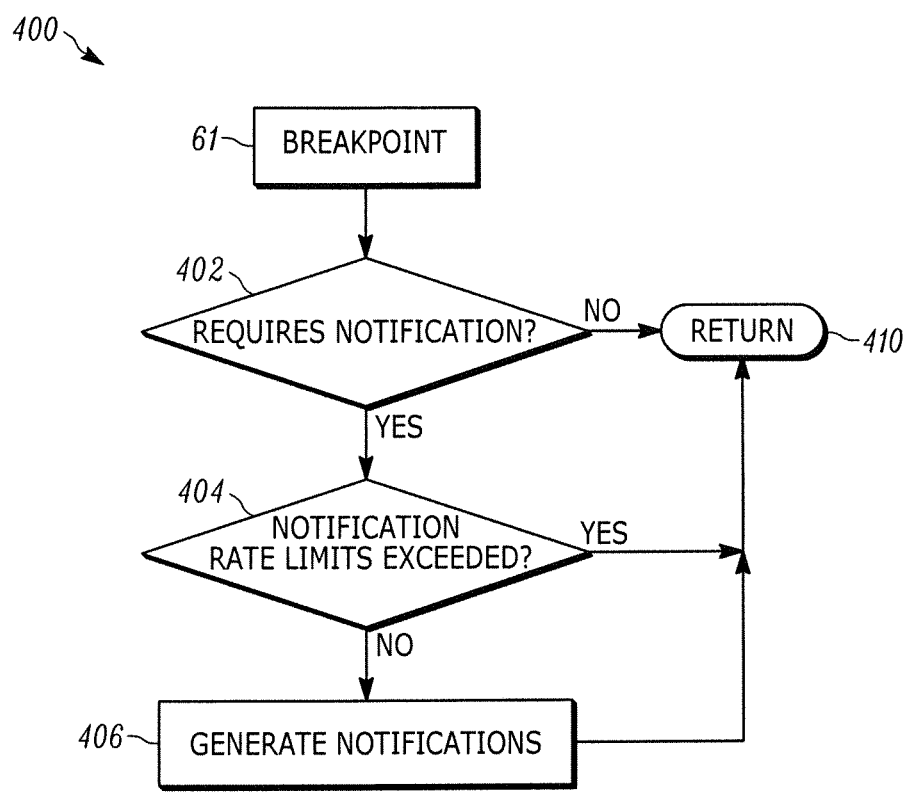
FIG. 4 is a flow diagram of a method for generating notifications as executed by an example of the described debugging software system.

FIG. 4 is a flow diagram of a method 400 for generating notifications as executed by an example of the described debugging software system. At a breakpoint 61, the method 400 (e.g., via the flow control program and/or the notification program) analyzes 402 whether a breakpoint direction/instruction necessitates transmission of a notification. If not, the program returns 410 to normal operation.

In some examples, the debugger system may rate limit notifications in order to avoid sending an overabundance of unnecessary notifications each time that a breakpoint fires. Accordingly the notification program may comprise a notification rate limiting routine 404 that determines whether a breakpoint notification rate limit exceeds a predetermined rate limit.

When a breakpoint notification rate limit is exceeded the notification process can limit sending notifications for a given period of time. During this time it can count the number of notifications for each breakpoint type to provide a summary to the user of the breakpoint activity.

When the notification rate limit is not exceeded, the method 400 may then initiate the process of generating 406 and/or transmitting notifications.

Action Execution

The debugger may assign a breakpoint a set of actions for execution when the breakpoint fires. These actions allow automated steps to be performed on behalf of the user. The actions may be executed, for example, by the action execution processor 140 or program, as shown in FIG. 2. In some examples, the action execution processor 140 may be automatically executed when a breakpoint goes unclaimed by a user, that is, when no signal is received indicating that the breakpoint has been claimed for a predetermined period of time. In this manner, the automated actions facilitate the debugging system to operate as an unattended debugger. In some examples, the execution processor 140 may process actions that operate in connection or in parallel with a user 50 that is manually performing debugging operations.

The actions can be used to gather information about the state of the program to help the user debug the program. Actions could also be used to implement automated fixes for bugs, for example, to keep the program running until an improved version of the program is installed. As discussed above, actions can include gathering or storage actions, that gather information pertaining to an operating value or operating state of (e.g., process conditions, parameters, variables, etc.) of the running program. Actions can also include code modification actions that automatically review, diagnose, and/or modify source code in the running computer program to treat bugs. Further, actions can include flow control actions that affect how the running program operates, the conditions that the running program operates under, the flow of the program, and the like. Actions can include, but are not limited to the following:
  (1) setting, modifying, or removing computer program variables;
  (2) executing a program code script;
  (3) generating logs, alerts, or notifications;
  (4) capturing data and program state;
  (5) gathering metrics from the program;
  (6) halting execution of the program until occurrence of an event;
  (7) adjusting the program resource requirements;
  (8) replacing or injecting code at the breakpoint;
  (9) recording the location and/or time of a breakpoint;
  (10) line step into, line step over, and/or line step out;
  (11) securing and/or controlling program usage;
  (12) resuming a program; and
  (13) aborting the program.

Accordingly, when the debugger encounters a breakpoint encoded with a particular action, the action execution program will execute the particular action configured to automatically debug, or assist in the debugging of the program. In this manner the action execution program facilitates operating the debugger in an unattended manner.

The definition of the actions could be introduced into the debugger in several ways. For example, the actions could be defined manually by a user via a user interface (e.g., operating a breakpoint building program or a breakpoint processing program). This can be advantageous in that the actions can be defined at any time and existing actions can be altered or removed by the user at any time.

In another example, actions can be defined in a definitions file or online service that can be loaded into the debugger at runtime. This has the advantage that actions can be copied, deployed and applied to many computer systems to avoid a user having to replicate the actions directly on each computer system where the program is installed.

In still another example, actions may be defined in the source code, as inserted by a user or programmer. This technique offers advantages because it allows the software developer to define actions that they would like to occur, without needing to distribute external configuration files.

Action Context

When the debugger halts the program, the current context of the program variables and stack is made available to each action. Typical debugging programs do not allow for direct execution of an action on a stopped program, or in the case of multi-threaded program, on the stopped thread because the debugger has halted execution on the program/thread.

Accordingly, the debugger provides infrastructure for setting and manipulating variables on the stopped program. However, in the case of executing a program script action, the debugger can create an action context by copying the variables from the program/thread into the environment of the script execution engine. The debugger can provide the script execution engine with functions that allow the action to influence the current state of the program variables.

Action Execution Conditions

In some examples, one or more conditions may be associated with actions. That is, the actions may be configured to execute only in certain situations, in certain settings, and/or under certain circumstances. These conditional actions allow the debugger to control which actions will be executed under which circumstances.

In some situations it may not be possible or even necessary to execute certain actions that investigate and/or rectify the issue (i.e., fix the bug). By employing the conditional actions described herein, the debugger allows the user to define actions that the user may have taken if they were present to actively interact with a debugger.

FIG. 10 is an example of an action code script of a debugging software system described herein. More specifically, FIG. 10 shows source code of an action that sets conditional parameters for the execution of the action.

Action Execution Flow Chart

Figure 5:
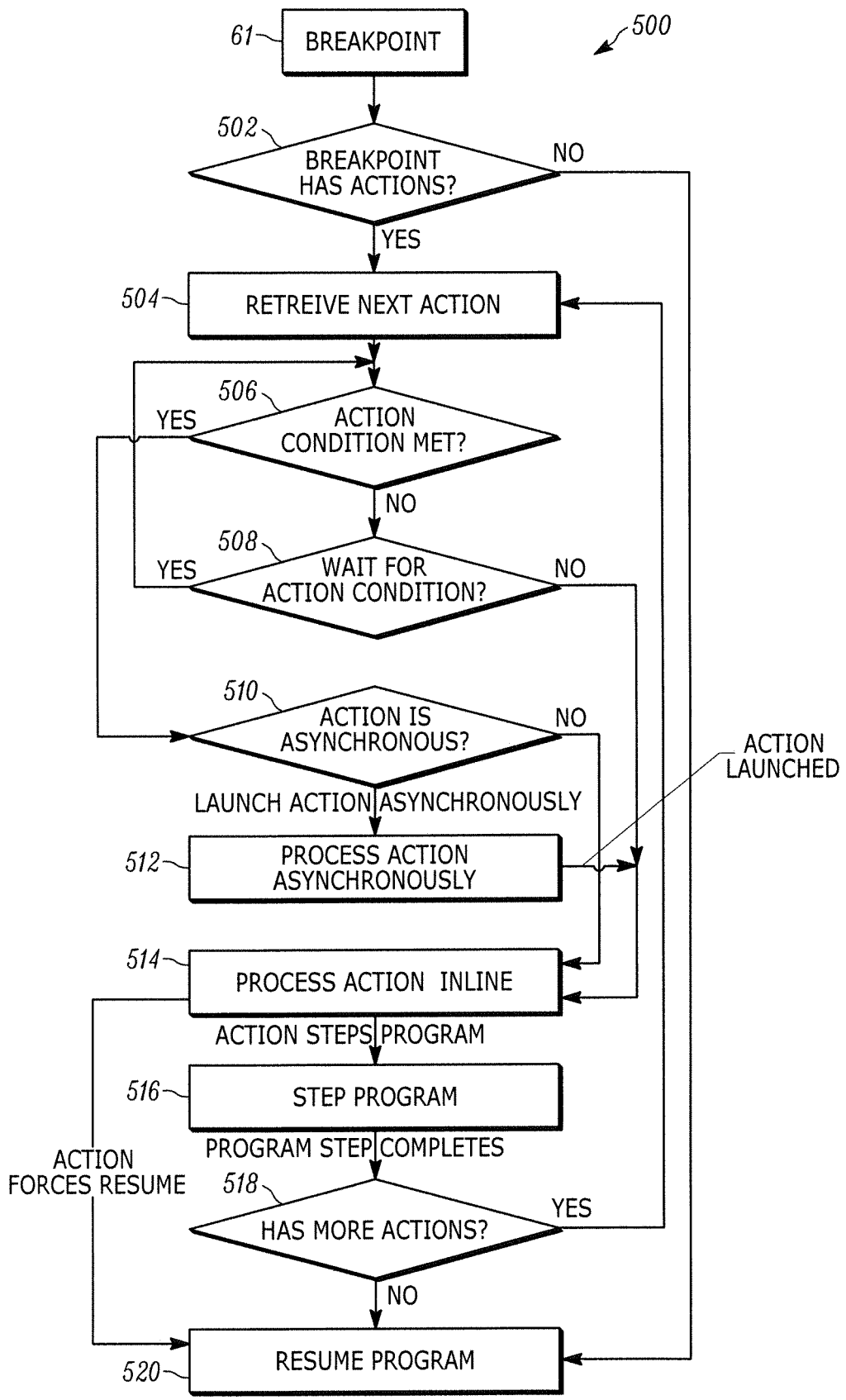
FIG. 5 is a flow diagram of a method for executing a debugging technique at a breakpoint in accordance with at least one aspect of the present disclosure.

FIG. 5 is a flow diagram of a method 500 for executing an action at a breakpoint. The method 500 be performed, for example, by the action execution program described herein.

For example, at a particular action, the debugger (e.g., via the flow control program, the breakpoint processor program, and/or the action execution program) may determine whether or not the breakpoint 61 has particular actions 502. If no actions are present, the debugger resumes 520 normal program operation.

However, if the breakpoint 61 has, or is associated with actions, the debugger proceeds to execute those actions. As shown in FIG. 5, the action execution process 500 determines 506 whether certain conditions of a conditional action are met, or otherwise currently exist. In some examples the action execution program may wait 508 for the action condition to occur.

In some examples, the action execution program may determine 510 whether the action is asynchronous. If so, the program may launch 512 an action asynchronously. Otherwise the action execution program may process 514 the action inline, for example, by stepping into 516 the program.

After processing the action, the process can determine 518 whether the breakpoint 61 has more actions. If there are no more actions, the process resumes 520. If there are more actions, the next action is retrieved 504, and the process resumes.

In this manner the actions associated with the breakpoints can facilitate the automatic, and thus unattended, nature of the debugger. Accordingly, the presently described debugger system can operate to debug programs where a user (i.e., a human operator) is not manually present or otherwise generally available to perform manual debugging techniques.

Example Interface: Creating a Breakpoint

The described debugger can be utilized as a feature in a larger software building application. For example, debugger can be implemented as a tool that is a part of a web-based program production application. Such a debugger tool can be operated, for example, by selecting a "debug" icon in the web-based production application. One example of operating through such a debugging routine will now be described.

In a first step, a user may enable the operation of the debugger. For example, a user may go to a settings menu, and select debugging to be enabled, thereby activating a configuration that allows a user to operate the debugger.

Figure 6:
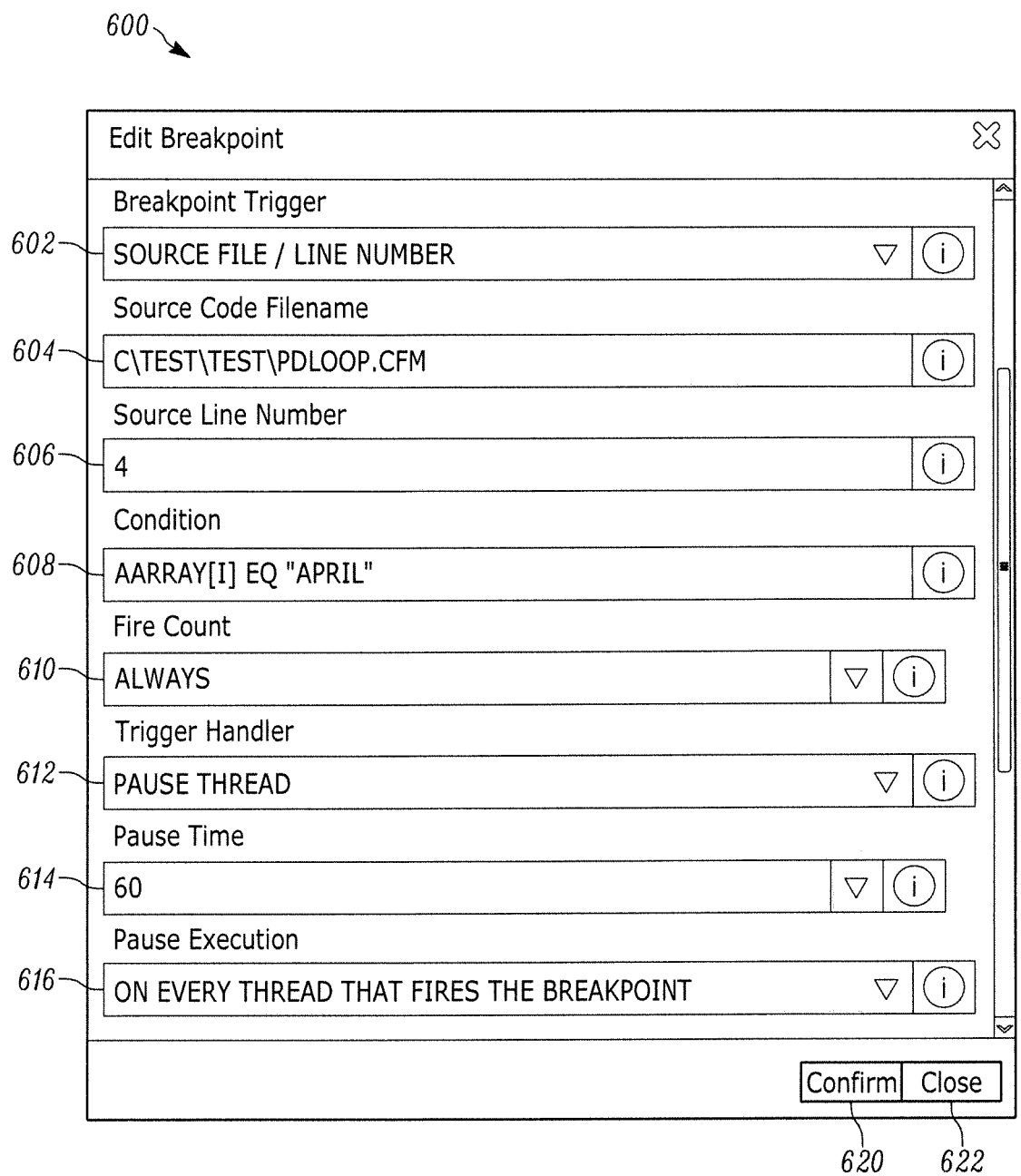
FIG. 6 is a screen shot showing a breakpoint builder user interface in accordance with aspects of the described debugging software system.

Next, a user may create or breakpoints in a running program (or modify or remove existing breakpoints) to use for debugging. FIG. 6 provides an example of a screen shot of an interface 600 for adding new breakpoints. Through this interface a user can add a new breakpoint, remove a breakpoint, or modify an existing breakpoint into the source code of a running computer application.

In FIG. 6, the interface 600 includes a breakpoint trigger pulldown menu 602. Through this menu 602, a user can select a specific type of breakpoint to add. For example, through menu 602 a user may be able to define how the breakpoint operates, and the role it is intended to play. In one example, the new breakpoint can be configured to stop on a line of code.

In the source code filename window 604 of the user interface 600, a user can enter the location of the source code that is to be debugged. For example, in window 604, the user can type a file location on a local computer or on a server where the source code is stored. In some examples, the user may be able to type in a web address or other path directory to where the source code is stored. In some embodiments, the interface 600 may be configured to auto populate this window, or to provide a list of file locations from a pull down menu.

In the source code line number window 606, a user can enter the precise line or range of lines in the source code where the breakpoint will be placed. In some examples, the interface 600 will provide a pop up window or other feature that allows the user to view the source code and select a line number in the context of the entire source code.

Once executed in this fashion, with the debugger enabled, the debugger will intercept any request to access or execute the line of code associated with this breakpoint. In this way, the debugger may cause a browser to generate stalling indication or a timeout error as a result of the debugging process. Because of this feature, a user may not wish to allow every request to access that particular line of code result in a stoppage. Accordingly, the described debugger is configured to allow a user to define terms and conditions that control how and when the breakpoint fires (i.e., is executed).

Condition window 608 allows the user to define conditions that dictate how and when the breakpoint will fire. For example, in condition window 608, the user may elect to set a condition that only causes the breakpoint to fire when it is accessed during a particular time of day (e.g., during off-peak hours), accessed by a particular IP address or user account, or accessed when a particular process variable or operating parameter is within a predefined range. Fire count window 610 allows the user to define a fire count number that defines how many times the breakpoint will be allowed to fire. For example, the user may define a breakpoint to fire always, once, never, or to fire n times, where n is a particular predetermined number defined by the user (e.g., 2, 5, 10, 1000, etc.), where the debugger keeps track of the number of times the debugger fired. The breakpoint will then fire on the initial request, and every other time until it has fired the particular number set in this field. On the n+1th request, the breakpoint condition will not be met, thus the breakpoint will not be enabled and will not execute. In this way, the debugger may be configured to only execute the breakpoint under certain conditions or in certain circumstances. For example, the debugger may be configured to execute the breakpoint only once, only during non-business hours, or only when accessed by a particular user. These conditions make the described debugger a useful tool that can be used safely in production, because it can be configured to not halt when conditions would be detrimental.

The trigger handler menu 612, allows the user to select from a variety of handling types for the breakpoint. That is, the trigger handler 612 allows the user to define the functionality that the breakpoint effects when executed (e.g., the handling type may be a breakpoint direction). For example, the trigger handler 612 can define an action such as pause thread, whereby the thread will pause when the breakpoint executes. The thread may pause for a duration defined in the pause time window 614 in the user interface. In this way, upon firing of the breakpoint, the thread may pause and wait to be claimed by a user. If the breakpoint is claimed, then other functionality or actions may be performed; however, if the breakpoint is not paused within a predetermined period of time (e.g., the time defined in the pause time window 614), the breakpoint will time out and the program may continue running. In other embodiments, the trigger handler window 612 may provide for adding notification directions that effect generation and transmission of a notification to remote user or remote device. The trigger handler window 612 may allow for adding modification actions that modify process parameters or variables, or that modify text of the source code. In some examples, the trigger handler window 612 may provide for adding flow control directions that trigger execution of a particular program, application, or routine, or that modify how the debugger continues to process the source code of the running application.

In some embodiments the user interface 600 will also have a pause execution menu 616 that allows the user to define how the thread breaks. For example, via the pause execution menu, a user can set the breakpoint to break on certain threads, on certain requests, or when activated by certain users.

User interface 600 also includes a confirm button 620 to confirm the introduction of the breakpoint as defined into the source code, and a close button 622, which can also be a cancel button, to cancel the placement of the breakpoint.

Upon entering the breakpoints and loading the web page (or otherwise executing the running program), the debugger will intercept the program execution and pause the thread. This may be intercepted, for example, by a flow control routine or program. In some examples, the debugger will then execute actions or other functionality to debug or diagnose issues with the running computer program. In other examples, the debugger may simply pause the threads until further action is ordered by a user, for example, by way of a user claiming a thread or stepping into the breakpoint.

Example Interface: Claiming a Breakpoint

FIG. 7 shows an example screen shot of a user interface 700 that may be generated by a computer operating an example debugger described herein. The interface 700 shows one or more threads 710 that have been paused, or otherwise represented by breakpoints processed by the debugger. Via this interface 700, a user may claim a thread by selecting or highlighting the thread on the user interface (e.g., using an input device such as a mouse, keyboard, touchscreen, etc.), and then selecting the "debug" button 720 or icon associated with the thread 710.

Selecting the debug button 720 may initiate an interactive debugging routine, and display a debugging interface, such as the interface 800 shown in FIG. 8. In some examples, a user may be able to select one of a number of stepping functions via step buttons 720 by selecting a one of a number of buttons or icons associated with the thread. For example, the stepping functions may allow a user to step into, out of, or over a line of code. The stepping functions may also be available to the user from the interactive debugger after claiming the breakpoint.

In other examples, a user may be able to claim a breakpoint by selecting a hyperlink transmitted via a notification, as described above. For example, the debugger may transmit a notification 900, as shown in FIG. 9. The notification may include a hyperlink 910. In this manner, a user selecting the hyperlink with an input device (e.g., by clicking on the hyperlink with a mouse, keyboard, touchscreen, or the like) can bring up an interface similar to interface 700 of FIG. 7, or in some examples, selecting the hyperlink it may take the user directly to the interactive debugging interface 800 of FIG. 8.

Example Interface: Interactive Debugging

FIG. 8 shows a screen shot of an example user interface 800 operating an interactive debugging tool. The interface comprises a source code viewer window 810, a variables viewer window 820, a stack trace view window 830, an information window 850, and a series of command operators.

The source code viewer window 810 shows the source code 814 for the location where the debugger is currently paused. In some examples, the source code viewer can be manipulated to show other portions of the source code. The source code viewer shows the line of code in a line column 812, and will generally open to a specific line as dictated by the breakpoint (e.g., as defined in the source line number window 606 of the breakpoint interface 600 of FIG. 6). Through the source code viewer window 810, a user may be able to manually modify the source code to correct errors (e.g., where the user discovers a faulty command, typographical error, etc.).

The variables window 820 displays various operating conditions or operating process values of the running computer program. More particularly, the variables window 820 shows the variables currently available on the thread at the specific location that the interactive debugger has paused. In some examples, the variables window 820 shows the variables as a tree, the top most nodes in the tree show the variables which are local variables in the function. In this way, the debugger presents the user with the ability to view and monitor whatever the code may be doing at any given moment.

The user may also be able to step through the code, using the stepper buttons (842, 844, 846, 848) on the interface 800. When selected (e.g., clicked) by a user, the stepper buttons allow the user to step through the running computer program. The stepper buttons put the user in control over what the thread does next, that is, which line of code in the thread will be processed following the processing of another line of code. In this way, the user can gain a sense of the flow control of the program.

For example, by selecting the step over button 848, the user can flow among the lines of the source code 814 based on the flow logic of the operating program. Further, a user may select the step into button 846 to directly step into a file or subprogram that may be referenced in the source code. In this way, by selecting the step into icon 846, the user interface 800 may pull up the source represented by the stepped into file and allow a user to manipulate or interact with the source code of the stepped into file. After completing a task with the stepped into file, the user can step out of the file by selecting the step out button 844, and return to the interface 800 presenting the original source code. The user can also select a resume button 842 to resume operating the program to completion from the selected point in the thread.

The interface also includes a set button 840, which allows a user to set or modify variables of the program. For example, by selecting the set button 840, the interface may pull up a window that allows a user to set, add, delete, or otherwise modify the value of a variable selected in the variable window 820.

The interface 800 also includes a stack trace view window 830, which allows the user to select which stack frame they would like to view. When changing the stack frame, the user can select an arrow or other icon associated with a frame, and the interface 800 will load the source code and variables for that stack frame. In some examples, the stack trace view window 830 depicts the specific frame represented in the interface 800 by highlighting that frame, for example, by highlighting an arrow associated with that frame.

The information window 850 provides information and statistics pertaining to the running program and/or the breakpoint. For example, the information window 850 may indicate when the breakpoint was fired, how long it has been paused, the name of the thread, the fire count, the description of the program or the breakpoint, and other information.

Examples: Computer Implemented Methods

The described debugger can be operated as a computer program executed by a computer processor (or multiple processors). When so operated, the processor(s) perform certain method steps that result in bugs in a running computer program being detected, diagnosed, repaired, removed, or otherwise eradicated. In this way, the method modifies the source code of the running program to improve the efficiency in which the source code operates. That is, the methods improve the way that a processor executing the running computer programs operate. Specific examples of such methods are described below, but it should be understood that the present technology is not limited to these examples. Further, it should be understood that steps, routines, and operations described with respect to one method can be used in addition to, or in place of the steps, routines, and operations described with respect to another method without deviating from the scope of the described technology.

One exemplary method involves monitoring source code of a running computer program and transforming that the source code to remove or repair bugs and to improve the performance of a computer processor executing the running computer program, The method is performed by one or more processors of a computing device (or devices). The processors are in communication (e.g., through a network or a local connection) with a memory and an input device.

The method comprises introducing a breakpoint to the source code of the running computer program. By introducing the breakpoint, the method may associate the breakpoint with at least one breakpoint direction and/or associate the breakpoints with at least one conditional firing rule. The breakpoint can be introduced by way of a breakpoint building program that defines a breakpoint and associates the breakpoint with directions, conditions, exclusions, and other functionality. The breakpoint builder program may introduce breakpoints, for example, by way of an algorithm or breakpoint adding program. Alternatively, the breakpoint builder program may present an interface that allows a user to define and set the directions, conditions, exclusions, and other functionality with the breakpoint. In some examples, the breakpoints may be introduced into original source code by the code developer.

The method further involves processing the source code of the running computer program on a computer processor. This processing may be performed line by line, step by step, routine by routine, thread by thread, or it may be performed continuously. The processing of the source code includes processing at least one instruction of the source code of the running computer program, and monitoring at least one operating value of the processed running computer program. The operating value can include, process variables, operating conditions (e.g., information pertaining to the time the process is operating, the user or machine controlling the operating, etc.), information pertaining to logic of the program (e.g., the truth of various if/then conditions), and the like. Processing the source code also includes processing at least one breakpoint of the source code of the running computer program (e.g., breakpoints introduced by the method, or breakpoints added by another method). Processing the breakpoint includes determining whether the breakpoint is enabled and/or whether the breakpoint is excluded.

Determining whether the breakpoint is enabled may include comparing at least one conditional firing rule associated with the breakpoint with at least one monitored operating value of the processed running computer program. For example, where a conditional firing rule associated with the processed breakpoint includes one or more ranges of allowable firing times (e.g., between 9 am and 5 pm), and where the monitored present time is within that range (e.g., 11 am), then it may be determined that the breakpoint is enabled. In another example, where a conditional firing rule associated with the processed breakpoint includes a maximum breakpoint firing value (e.g., a rule indicating that the breakpoint can only fire 5 times), and where the process monitors that the processed breakpoint has fired less than the maximum value (e.g. 3 times) over a given period, then the breakpoint may be determined enabled.

Processing the breakpoint may also include determining whether the breakpoint is excluded. This may include determining whether any current operating values are consistent with any exclusion rules defined in the breakpoint. For example, a breakpoint rule may exclude the breakpoint from firing where other breakpoints are currently stalled. In such a case, the enabled breakpoint may be deemed not-enabled, or excluded.

The method further includes executing at least one breakpoint direction associated with the enabled breakpoint. The breakpoint direction can include, for example, directions to transmit notifications, directions to perform actions, or directions to process other functionality.

In some examples the method will execute a breakpoint direction associated with generating a notification. In response to executing such a notification direction, the method may involve effecting transmission of at least one notification to a remote user. Effecting transmission of a notification may include opening a notification processor that generates notifications or notification templates. The notification processor may automatically generate and transmit a notification, or it may provide a user interface that allows a user to generate, modify, and send a notification. The effecting transmission of a notification may further include embedding a hyperlink in the notification, where the embedded hyperlink is configured so that a user selecting the embedded hyperlink (e.g., clicking on the hyperlink with an input device such as a mouse or touch interface), causes a claim signal to be sent to the processor operating the method. In some examples, the notification will include information pertaining to the at least one monitored operating value of the processed running computer program. In some examples, the method may involve monitoring the number of notifications that have been transmitted, and determine not to transmit a notification if that number exceeds a predetermined threshold.

In some examples the method will execute a breakpoint direction associated with generating an action. In response to executing such an action direction, the method may involve executing an action. The action may be configured to cause one or more of the following effects or functions: (1) storing information about the state of the running computer program on a memory or data storage device, (2) modifying the source code of the running computer program, and/or (3) controlling the flow of the processing of the source code of the running computer program (e.g., changing process variables, stopping the running program, selecting one or more particular lines of the source code to operate, etc.). In some examples, executing an action will include stopping the processing of the running computer program, modifying at least one variable associated with the halted program, and executing at least one instruction in the halted program with the context of the at least one modified variable. In other examples, the action may include executing a program routine (e.g., a diagnosis routine, a process check routine, a language check routine, etc.) not associated with the running computer program. The program routine may be configured to automatically detect the existence of a bug in the source code of the running computer program, and, in response to detecting a bug, executing a second program routine not associated with the running computer program to automatically modify the source code of the running computer program.

In some examples the method will execute a breakpoint direction associated with pausing a thread. In response to executing such a pause action, the method may halt processing the running computer program until either a claim signal is received from an input device, or the processing has been halted for the maximum pause time. If the thread is claimed, the method may presenting a debugging user interface to a user (e.g., on a remote computing device or locally on the processing computer). The debugging user interface allows an input device (e.g., a keyboard, mouse, touch interface, etc.) to interact with and debug the modified source code of the running computer program. Through the user interface, the user can send (and the method can involve receiving the command), wherein the command causes the method to modify the source code of the running computer program, or to modify certain operating values of the running program.

In some examples, the method further includes the steps of modifying the source code of the running computer program, and then executing the modified source code of the running computer program with a computer processor.

In another exemplary method, a computer processor executes functionality to remove or repair bugs from the script and to improve the performance of a computer processor executing the script. The script of the running computer program has at least one breakpoint instruction, which may be provided, for example, via a breakpoint building program.

The method includes executing a script execution engine with a computer processor. The script execution engine is configured to process the script of the running computer program and to monitor one or more process operating values of the running computer program. The script execution engine is further configured to generate breakpoint processing instructions, notification instructions, and execution instructions. The script execution engine can be operated automatically, or in connection with a user, for example, by providing a user interface that allows the user to control processing of the script.

The method also includes executing a breakpoint processor routine (or program, application, algorithm, processor, etc.) in response to the script engine generating a breakpoint processing instruction. The breakpoint processor routine is configured to determine whether a breakpoint in the script of the running computer program is enabled and to execute directions associated with an enabled breakpoint. The breakpoint processor routine may compare process variables or operating conditions/parameters with rules, conditions, and exclusions defined in the breakpoint to determine whether the breakpoint is enabled and/or excluded.

The method also executes a notification routine in response to the script execution engine generating a notification instruction. The notification routine is configured to effect the generation and transmission of a notification. The notification routine may automatically generate and/or transmit a notification, or it may present a user interface that allows a user to create or modify a notification, and to select to send the notification.

The method also includes executing an action execution routine in response to the script execution engine generating an action instruction. The action execution routine can generate actions that are performed automatically, or that operate with user interfaces that allows a user to select an action, or to perform certain steps in the action.

In operation, the script execution engine generates a breakpoint processor instruction (thereby activating the breakpoint processor routine) when the script execution engine processes a breakpoint. The script execution engine also generates a notification instruction (thereby activating the notification routine) when the breakpoint processor program executes a breakpoint direction associated with generating a notification. The script execution engine also generates an execution instruction (thereby activating the action execution routine) when the breakpoint processor routine executes breakpoint directions associated with an action. The actions executed by the action execution routine cause a number of different functions including: (1) information about the state of the running computer program to be stored on a memory, (2) the source code of the running computer program to be modified or diagnosed, and (3) the flow of the processing of the script of the running computer program to be controlled or otherwise directed by the script execution engine.

In some examples, executing an action includes executing a stall avoidance routine. The stall avoidance routine may be executed in response to processing a breakpoint that is marked as stall-protected. For example, in some sections of code, halting the program for long periods of time can lead to the program becoming unstable or stalled. Thus, the stall avoidance routine can be used to determine whether halting the running computer program at the stall-marked breakpoint will cause the running computer program to stall or become unstable, for example, based on the operating conditions of the running program. In response to making a determination that halting the running computer program will cause a stall, or will be likely to cause a stall or other program instability, the stall avoidance routine can issue an override command. The override command can prevent execution of any actions that halt the running computer program at the marked breakpoint. That is, if any other features of the debugger would otherwise cause the program to halt at the stall-marked breakpoint, the override command can negate such a command so that the program continues operation without halting despite the attempt to halt the program.

In some examples, the method may also include executing a breakpoint builder routine. The breakpoint builder routine may be executed in response to receiving an add breakpoint signal from an input device (e.g., where a user selects an interface functionality to add a breakpoint). The breakpoint builder routine introduces breakpoints to the script of the running computer program, and associates those breakpoints with one breakpoint direction. The breakpoint builder routine also associates the breakpoints with conditional firing rules. In operation, the breakpoint processor routine determines whether a breakpoint in the script is enabled, for example, by comparing the conditional firing rule of the script and the value of at least one process of the running computer program.

The present disclosure describes preferred embodiments and examples of the debuggers and related machines, techniques, methods, and programs. Those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. In addition, it should be understood that features of one embodiment may be combined with features of other embodiments to provide yet other embodiments as desired. All references cited in the present disclosure are hereby incorporated by reference in their entirety.

The invention claimed is:

1. A computer-implemented method for monitoring source code of a running computer program and for transforming the source code to remove or repair bugs in the source code and to improve the performance of a computer processor executing the running computer program, the method performed by or more processors in communication with at least one input device, the method comprising performing the following steps with the one or more processors:

introducing a stopping breakpoint to the source code of the running computer program wherein the running computer program is executing in a production environment, the introducing including:
associating the stopping breakpoint with at least one breakpoint direction; and
associating the stopping breakpoint with at least one conditional firing rule;
processing the source code of the running computer program on a computer processor, the processing including:
processing at least one instruction of the source code of the running computer program;
monitoring at least one operating value of the processed running computer program; and
processing the stopping breakpoint of the source code of the running computer program to determine that the stopping breakpoint is enabled by comparing the at least one conditional firing rule associated with the stopping breakpoint with at least one monitored operating value of the processed running computer program;

executing at least one breakpoint direction associated with the stopping breakpoint, wherein the executing the at least one breakpoint direction occurs in a same environment as the running computer program;

determining, based on a stall avoidance routine, whether the stopping breakpoint is marked as stall-protected;

if the stopping breakpoint is marked as stall-protected, determining whether halting the running computer program at the stopping breakpoint will cause the running computer program to stall; and in response to determining that halting the running computer program will cause a stall, issuing an override that prevents any actions that halt the running computer program in response to execution of the stopping breakpoint;

if the stopping breakpoint is one of not marked as stall-protected and marked as stall-protected but will not cause the running computer program to stall, in response to executing the at least one breakpoint direction associated with the stopping breakpoint, halting the processing of the source code of the running computer program;

effecting transmission of at least one notification to a remote user in response to executing breakpoint directions associated with generating a notification;

if a claim signal is not received from the at least one input device within a maximum pause time, resuming the processing of the source code of the running computer program; and executing at least one action in response to executing breakpoint directions associated with generating an action, the execution of an action causing at least one of the following effects:

the storage of information about the state of the running computer program in a memory;

modification of the source code of the running computer program; and controlling the flow of the processing of the source code of the running computer program.

2. The method of claim 1, wherein a conditional firing rule associated with the processed breakpoint includes a maximum breakpoint firing value, wherein the monitoring at least one operating value of the processed running computer program comprises counting a number of times the processed breakpoint has fired over a given period, wherein the stopping breakpoint is determined to be enabled where the number of times the stopping breakpoint has fired over the given period does not exceed the maximum breakpoint firing value, and wherein the stopping breakpoint stops the running computer program when the stopping breakpoint is enabled and the stopping breakpoint fires.

3. The method of claim 1, wherein a conditional firing rule associated with the stopping breakpoint includes one or more windows of allowable firing times, wherein the monitoring at least one operating value of the processed running computer program comprises monitoring a present time, wherein the stopping breakpoint is determined to be enabled if the present time is within the one or more windows of allowable firing times, and wherein the stopping breakpoint stops the running computer program when the stopping breakpoint is enabled and the stopping breakpoint fires.

4. The method of claim 1, wherein the stopping breakpoint in the source code of the running computer program includes at least one breakpoint exclusion rule, and wherein the step of determining whether the stopping breakpoint is enabled further comprises determining whether any breakpoint exclusion rules of an enabled breakpoint are met.

5. The method of claim 1, further comprising the steps of:
presenting a debugging user interface in response to receiving a claim signal from the input device, the debugging user interface being configured to allow an input device to remotely interact with and debug the modified source code of the running computer program; and receiving a debugging command via the debugging user interface and modifying the source code of the running computer program based on the debugging command.

6. The method of claim 1, wherein the effecting transmission of at least one notification comprises embedding a hyperlink in the notification, wherein the embedded hyperlink is configured so that selecting the embedded hyperlink with an input device effects the transmission of a claim signal from an input device.

7. The method of claim 1, wherein the notification transmitted to the remote user comprises information pertaining to the at least one monitored operating value of the processed running computer program.

8. The method of claim 1, further comprising the step of monitoring the number of notifications transmitted, wherein the step of effecting transmission of at least one notification to a remote user comprises determining whether the number of notifications transmitted exceeds a predetermined threshold of notifications, and effecting the transmission of a notification only if the predetermined threshold has not been exceeded.

9. The method of claim 1, wherein the executing at least one action comprises, in response to executing a breakpoint direction associated with generating a gathering action, executing an action configured to effect at least one of the following:

creating a data file, deleting a data file, adding data to a data file, removing data from a data file, or modifying data in a data file, the data file being maintained in a memory;

storing information pertaining to the monitored operating value of the running computer in a data file in a memory; and recording and storing information pertaining to the processing of a breakpoint in a data file in a memory.

10. The method of claim 1, wherein the executing at least one action comprises, in response to executing a breakpoint direction associated with generating a code modification action, executing an action configured to effect at least one of the following: adding, removing, replacing, or modifying the source code of the running computer program; and presenting a user interface accessible via a remote input device, wherein the user interface allows the remote input device to add, remove, replace, or modify the source code of the running computer program.

11. The method of claim 1, wherein the executing at least one action comprises, in response to executing a breakpoint direction associated with generating a flow control action, executing an action configured to effect at least one of the following:

setting, modifying, or removing variables of the running computer program;

executing a code script of the running computer program;

executing, halting, or resuming, a program routine that is not associated with the running computer program;
halting execution of the running computer program until occurrence of a predetermined event;
adjusting the resource requirements of the running computer program;
controlling execution and usage of the running computer program; and aborting the running computer program.

12. The method of claim 1, wherein the effecting execution of at least one action comprises halting processing of the running computer program, modifying at least one variable associated with the halted program, and executing at least one instruction in the halted program with the context of the at least one modified variable.

13. The method of claim 1, wherein the effecting execution of at least one action comprises executing a program routine not associated with the running computer program to automatically detect the existence of a bug in the source code of the running computer program, and, in response to detecting a bug, executing a second program routine not associated with the running computer program to automatically modify the source code of the running computer program.

14. The method of claim 1, further comprising the step of modifying the source code of the running computer program.

15. The method of claim 1, further comprising the step of executing the modified source code of the running computer program with a computer processor.

16. A computer-implemented method for debugging a script of a running computer program to remove or repair bugs from the script and to improve the performance of a computer processor executing the script, the script of the running computer program having at least one breakpoint instruction, the method comprising the following steps:
    executing a script execution engine with a computer processor, the script execution engine configured to process the script of the running computer program wherein the running computer program is executing in a production environment, and to monitor at least one operating value of the running computer program, the script execution engine further configured to generate breakpoint processing instructions notification instructions, and execution instructions;
    executing a breakpoint processor routine on a computer processor in response to the script engine generating a breakpoint processing instruction, the breakpoint processor routine configured to determine whether a stopping breakpoint in the script of the running computer program is enabled and to execute directions associated with an enabled breakpoint, wherein the executing the breakpoint processor routine occurs in a same environment as the running computer program;
    determining, based on a stall avoidance routine, whether the stopping breakpoint is marked as stall-protected;
    if the stopping breakpoint is stall protected,
        determining whether halting the running computer program at the stopping breakpoint will cause the running computer program to stall; and
        in response to determining that halting the running computer program will cause a stall, issuing an override that prevents any actions that halt the running computer program in response to execution of the stopping breakpoint;
    if the stopping breakpoint is one of not marked as stall-protected and marked as stall-protected but will not cause the running computer program to stall,
        in response to executing the breakpoint processor routine, halting the processing of the script of the running computer program;
    executing a notification routine on a computer processor in response to the script execution engine generating a notification instruction, the notification routine configured to effect the generation and transmission of a notification;
    if a claim signal is not received from an input device within a maximum pause time, resuming the processing of the script of the running computer program; and
    executing an action execution routine on a computer processor in response to the script execution engine generating an action instruction,
    wherein the script execution engine is configured to generate a breakpoint processor instruction in response to the script execution engine processing a breakpoint,
    wherein the script execution engine is configured to generate a notification instruction in response to the breakpoint processor routine executing a breakpoint direction associated with generating a notification,
    wherein the script execution engine is configured to generate an execution instruction in response to the breakpoint processor routine executing breakpoint directions associated with an action, and
    wherein the action execution routine is configured to execute an action that effects at least one of the following:
        storage of information about the state of the running computer program in a memory;
        modification of the source code of the running computer program; and
        control the flow of the processing of the script of the running computer program by the script execution engine.

17. The method of claim 16, further comprising the step of executing a breakpoint builder routine in response to receiving an add breakpoint signal from an input device, the breakpoint builder routine configured to introduce at least one breakpoint to the script of the running computer program, to associate breakpoints in the script of the running computer program with at least one breakpoint direction; and to associate the breakpoints in the script of the running computer program with at least one conditional firing rule, wherein the breakpoint processor routine is configured to determine whether a breakpoint in the script is enabled based at least in part on the conditional firing rule of the script and the value of at least one process of the running computer program, and wherein the stopping breakpoint only halts the running computer program when the stopping breakpoint is enabled.

18. A computer program product for debugging a running computer program comprising: a non-transitory computer readable storage medium having computer readable program code embodied therewith for execution on a processing system, the computer readable program code comprising computer readable program code configured to:
    introduce a stopping breakpoint to source code of the running computer program, wherein the running computer program is executing in a production environment;
    associate the stopping breakpoint with at least one breakpoint direction;
    associate the stopping breakpoint with at least one conditional firing rule;

process at least one instruction of the running computer program;

monitor at least one operating value of the processed running computer program;

compare at least one conditional firing rule associated with the stopping breakpoint in the running computer program with a monitored operating value of the running computer program to determine whether the stopping breakpoint is enabled;

execute at least one breakpoint direction associated with an enabled breakpoint, wherein the execution of the at least one breakpoint direction occurs in a same environment as the running computer program;

determine, based on a stall avoidance routine, whether the stopping breakpoint is marked as stall-protected;

if the stopping breakpoint is marked as stall-protected, determine whether halting the running computer program at the stopping breakpoint will cause the running computer program to stall; and in response to a determination that halting the running computer program will cause a stall, issue an override that prevents any actions that halt the running computer program in response to execution of the stopping breakpoint;

if the stopping breakpoint is one of not marked as stall-protected and marked as stall-protected but will not cause the running computer program to stall, in response to the execution of the at least one breakpoint direction associated with an enabled breakpoint, halt the processed running computer program;

effect transmission of a notification to a remote user in response to executing a breakpoint direction associated with generating a notification;

if a claim signal is not received from an input device within a maximum pause time, resume the processed running computer program; and execute a gathering action that effects the storage of information about the state of the running computer program in a memory in response to executing a breakpoint direction associated with generating a gathering action, execute a script modification action that modifies the source code of the running computer program in response to executing a breakpoint direction associated with generating a script modification action; and execute a flow control action that controls the further processing of the running computer program in response to executing a breakpoint direction associated with generating a flow control action.

* * * * *